(12) United States Patent
Hall

(10) Patent No.: US 7,377,022 B2
(45) Date of Patent: May 27, 2008

(54) DRILL PRESS LATHE ATTACHMENT

(76) Inventor: James W. Hall, 2933 NE. 48th Ave., Portland, OR (US) 97213

( * ) Notice: Subject to any disclaimer, the term of this patent is extended or adjusted under 35 U.S.C. 154(b) by 343 days.

(21) Appl. No.: 11/228,072

(22) Filed: Sep. 16, 2005

(65) Prior Publication Data

US 2007/0062023 A1 Mar. 22, 2007

(51) Int. Cl.
*B23P 23/00* (2006.01)
(52) U.S. Cl. .................. 29/560; 29/26 A; 29/27 A; 409/240; 82/171; 144/46; 408/20
(58) Field of Classification Search ............... 29/560, 29/27 R, 27 A, 27 C, 26 R, 26 A, 26 B; 82/171; 144/1.1, 46; 408/20, 22–23; 142/55, 142/1; 409/240, 165, 215
See application file for complete search history.

(56) References Cited

U.S. PATENT DOCUMENTS

| | | |
|---|---|---|
| 2,089,362 A | 8/1937 | Haas |
| 2,200,799 A | 5/1940 | Miller |
| 2,641,150 A * | 6/1953 | Harry ............................ 82/171 |
| 3,709,622 A | 1/1973 | Morse |
| 3,828,834 A | 8/1974 | Morse |
| 4,161,974 A | 7/1979 | Patterson |
| 4,349,945 A | 9/1982 | Fox |
| 4,515,191 A | 5/1985 | Fetty |
| 4,830,069 A | 5/1989 | Milyard |
| 5,301,405 A * | 4/1994 | Maker ......................... 29/26 A |
| 5,562,135 A | 10/1996 | Beth et al. |
| 5,586,382 A * | 12/1996 | Ganem ......................... 29/560 |
| 5,865,228 A | 2/1999 | Patterson |
| 5,890,521 A | 4/1999 | Dunn |
| 6,102,089 A | 8/2000 | McCormick |
| 6,915,726 B2 | 7/2005 | Liao |
| 2005/0084348 A1* | 4/2005 | Wu ............................. 408/199 |

OTHER PUBLICATIONS

Shopsmith Mark V—Woodworking Dream, http://www.shopsmith.com/markvsite/index.htm, visited Jul. 27, 2005.
Shopsmith Mark V5-Tools-In-One, http://www.shopsmith.com/markvsite/5tools.htm, visited Jul. 27, 2005.
Shopsmith Mark V-Features, http://www.shopsmith.com/markvsite/features.htm, visited Jul. 27, 2005.

(Continued)

*Primary Examiner*—Erica Cadugan
(74) *Attorney, Agent, or Firm*—J. Douglas Wells; Chernoff, Vilhauer, McClung & Stenzel, LLP

(57) ABSTRACT

The present invention provides a drill press lathe attachment designed for rotating a workpiece along a horizontal axis to remove material from the workpiece to form it into a desired shape. The drill press lathe attachment comprises a base and a power transfer box along with components commonly found on a lathe, but without a motor. The drill press lathe attachment, or "motorless" lathe, may be mounted directly to the bed of an existing drill press thereby providing an alternative means of achieving turning operations without needing a traditional motor driven lathe.

16 Claims, 8 Drawing Sheets

OTHER PUBLICATIONS

Mini-lathe Features, http://www.mini-lathe.com/Mini_lathe/Features/features.htm, visited Jul. 27, 2005.

Mini Lathe Introduction, http://www.mini-lathe.com/Mini_lathe/Introduction/introduction.htm, visited Jul. 27, 2005.

The Vertilathe—Drill Press Lathe, http://www.toolcenter.com/Hertilathe.html, visited Mar. 14, 2005.

Drill Press Lathe: Penn State Industries, http://www.pennstateind.com/Merchang2/merchant.mvc?Screen+PROD&Store, visited Mar. 14, 2005.

Inland Product Information for PowerKits BenchTop Lathe AddOn™ Kit, http://www.inlandcraft.com/Plsheets,Plarchive/Plpklathe.htm, visited Mar. 14, 2005.

Inland Product Information for PowerKits Main Frame and Power Units, http://www.inlandcraft.com/Plsheets/Plarchive/Plpkmain.htm, Mar. 14, 2005.

* cited by examiner

DRILL PRESS LATHE ATTACHMENT

CROSS-REFERENCE TO RELATED APPLICATIONS

None.

BACKGROUND OF THE INVENTION

The technical field of invention relates to a lathe device. More particularly, the present invention pertains to a drill press lathe attachment for rotating a workpiece along a horizontal axis to remove material from the workpiece to form it into a desired shape.

On a woodworking lathe, the cutting tools are usually held by hand against a tool rest and are moved inward and outward perpendicular to the axis of rotation and also back and forth along the axis of rotation to form a shape such as a furniture leg. By contrast, on a metalworking lathe, the cutting tools are held rigidly in a tool holder that is mounted on a movable carriage. The cutting tool is moved inward and outward perpendicular to the axis of rotation and also back and forth along the axis of rotation either by hand cranking carriage and leadscrew handwheels or under power from the lathe. Generally, material may be removed from the workpiece with greater precision using a metalworking lathe than is possible using a woodworking lathe.

A typical lathe includes a headstock and a tailstock disposed upon a horizontal bed allowing a workpiece to be placed between the two and supported at least by a spindle projecting from the headstock and typically by the spindle as well as a live center mounted on the tailstock. Typically, an electric motor, belts, and gears are housed in the headstock and provide rotational forces to the spindle. The spindle rotates the workpiece along a horizontal axis, and the workpiece may then be reduced (or turned) to the desired shape by (hand or mechanical) application of the cutting tools. Precision is maintained by the axial alignment of the spindle and the precision ground surfaces (or ways) upon which the tailstock (and carriage) slides back and forth along the axis of rotation.

It is common practice to use a standalone lathe for woodworking and metalworking applications. Likewise, a separate and dedicated drill press is typically used for drilling and boring applications, a separate and dedicated table saw is used for cutting operations, and so on. However, combination or multi-purpose tools are available in the marketplace which require less shop space, potentially reduce overall equipment costs, or offer a desired utility in routine situations. These combination tools tend to be more complex in structure and require manipulation to reconfigure them from one function to another. For example, U.S. Pat. No. 5,562,135 (1996) to Beth et al. discloses a combination woodworking tool with the combined capabilities of a drill press, router, and woodworking lathe. To use this tool as a lathe, the powerhead is vertically adjusted down to the horizontal bed while also rotatably adjusted for positioning the spindle in a horizontal position for cooperation with a separately mounted lathe tailstock and tool rest.

Another approach may be to convert a conventional drill press into a lathe. For example, U.S. Pat. No. 6,102,089 (2000) to McCormick discloses a drill press modified for use as a wood lathe using a driving spur affixed to the chuck of the drill press for engaging one end of a wood workpiece. An adapter plate is affixed to the bed of the drill press whereon a tailstock is attached for engagement with the opposite end of the wood workpiece. And a tool rest is affixed to the adapter plate for use with a shaping tool. Operation of the resulting device involves rotating the workpiece along its vertical axis to remove material from the workpiece to form it into a desired shape. This non-traditional (vertical) orientation may be undesirable for a variety of lathe applications.

What is needed is a drill press lathe attachment that retains the advantages and benefits of conventional woodworking and metalworking lathes while providing improved mobility, lower cost, simplicity of use, and so forth. What is needed, therefore, is a drill press lathe attachment designed for rotating a workpiece along a horizontal axis to remove material from the workpiece to form it into a desired shape.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

Figure 5C:
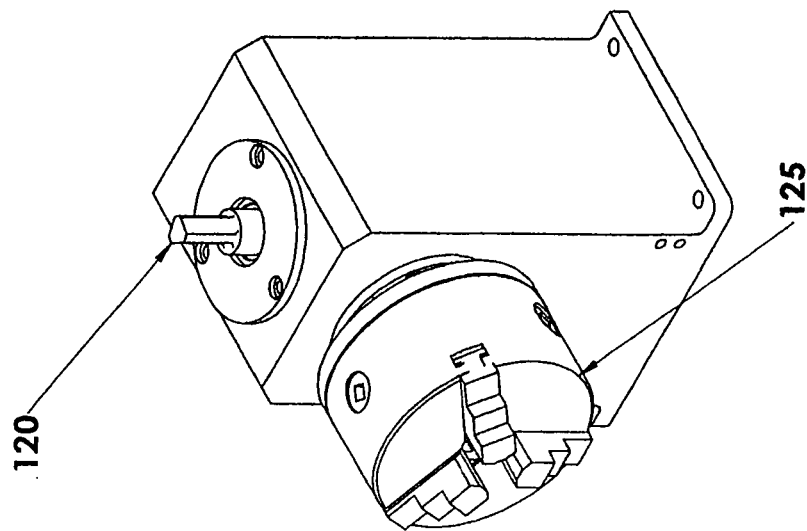
Figure 5B:
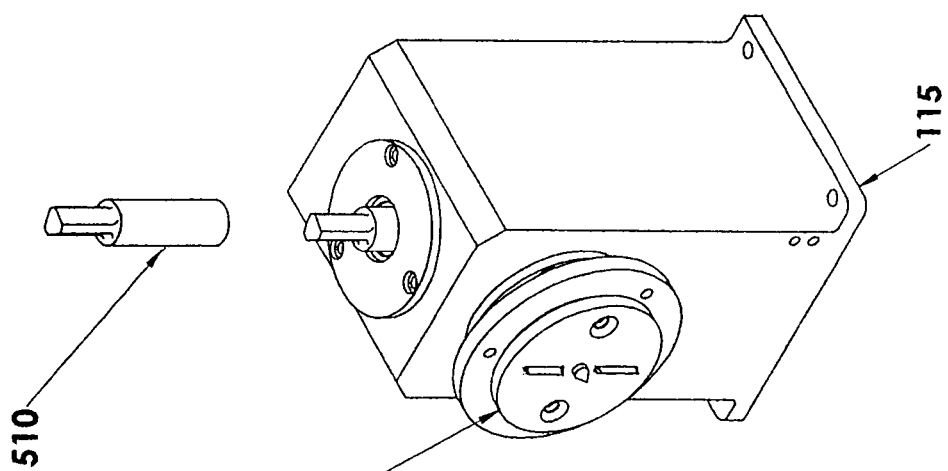
Figure 5A:
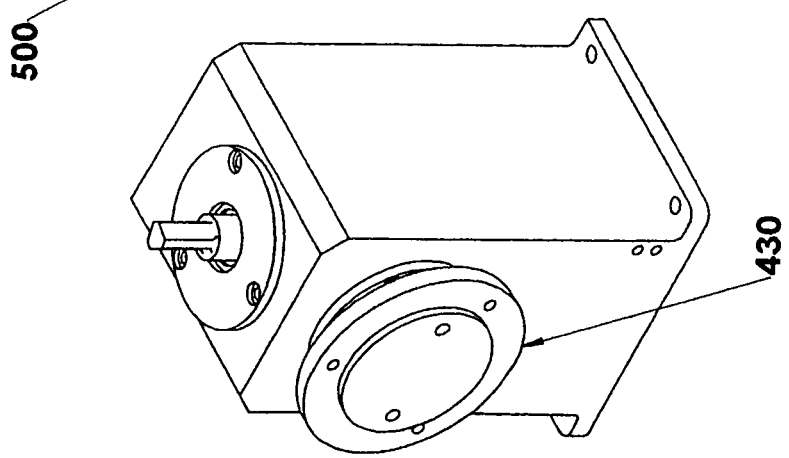

FIGS. 5a, 5b, and 5c illustrate exemplary input and output shaft combinations associated with a power transfer box, according to one embodiment of the invention.

Figure 6A:
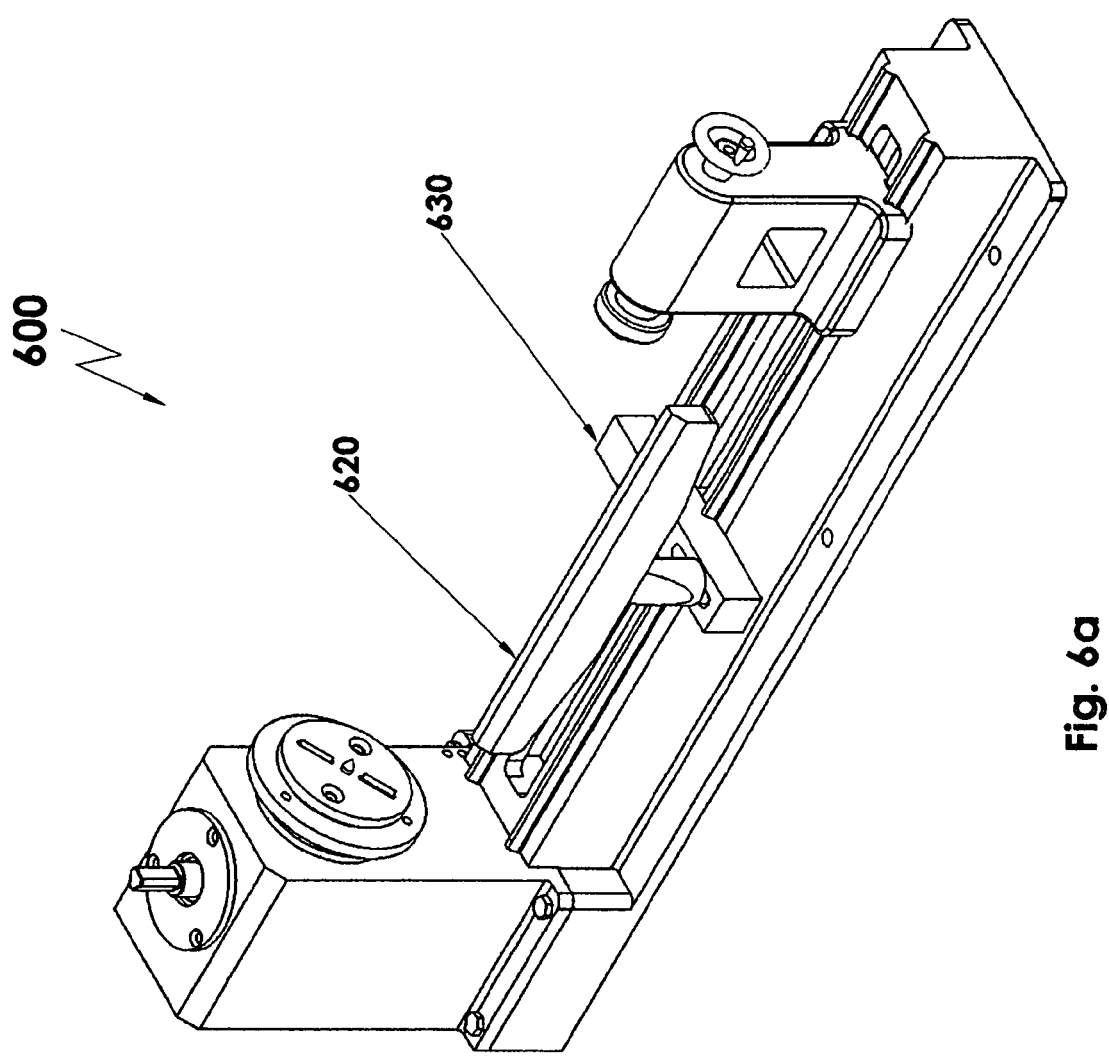
Figure 6B:
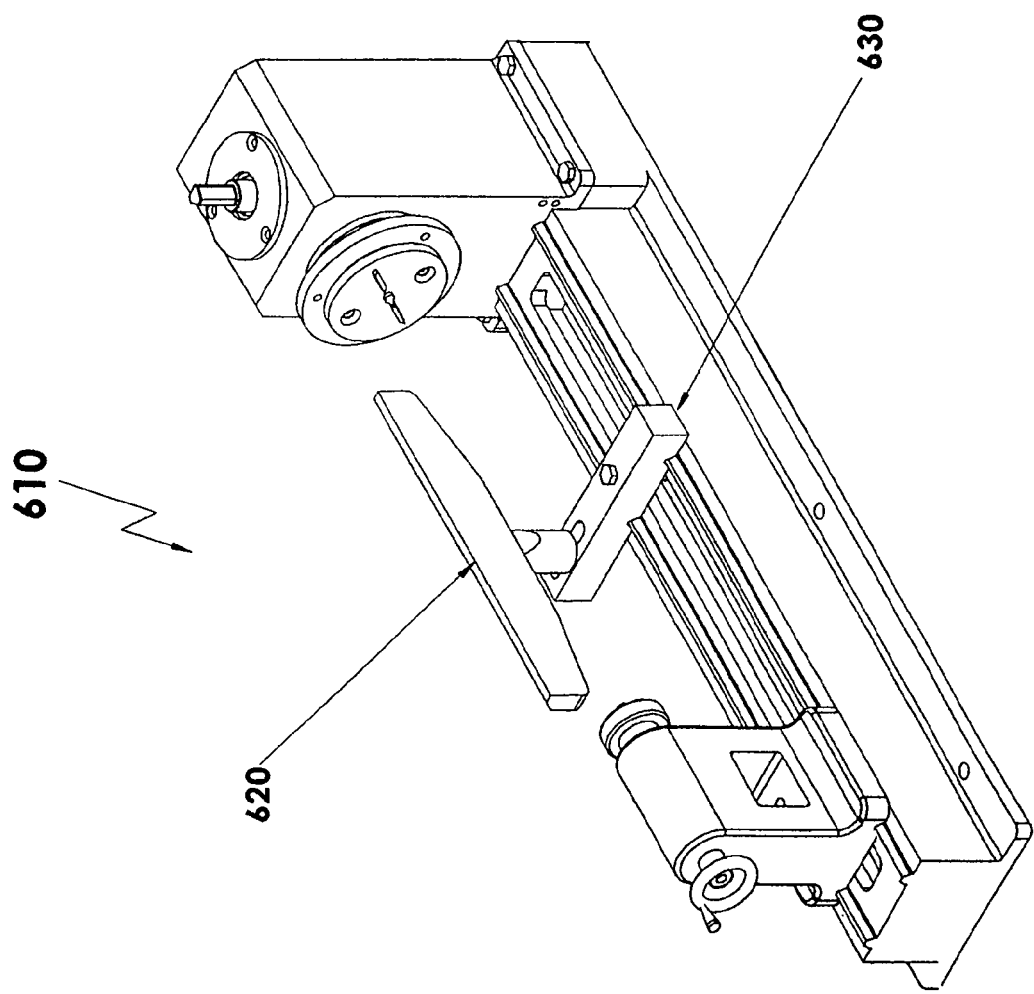

FIGS. 6a and 6b illustrate a drill press lathe attachment configured as a woodworking lathe, according to one embodiment of the invention.

Figure 7:
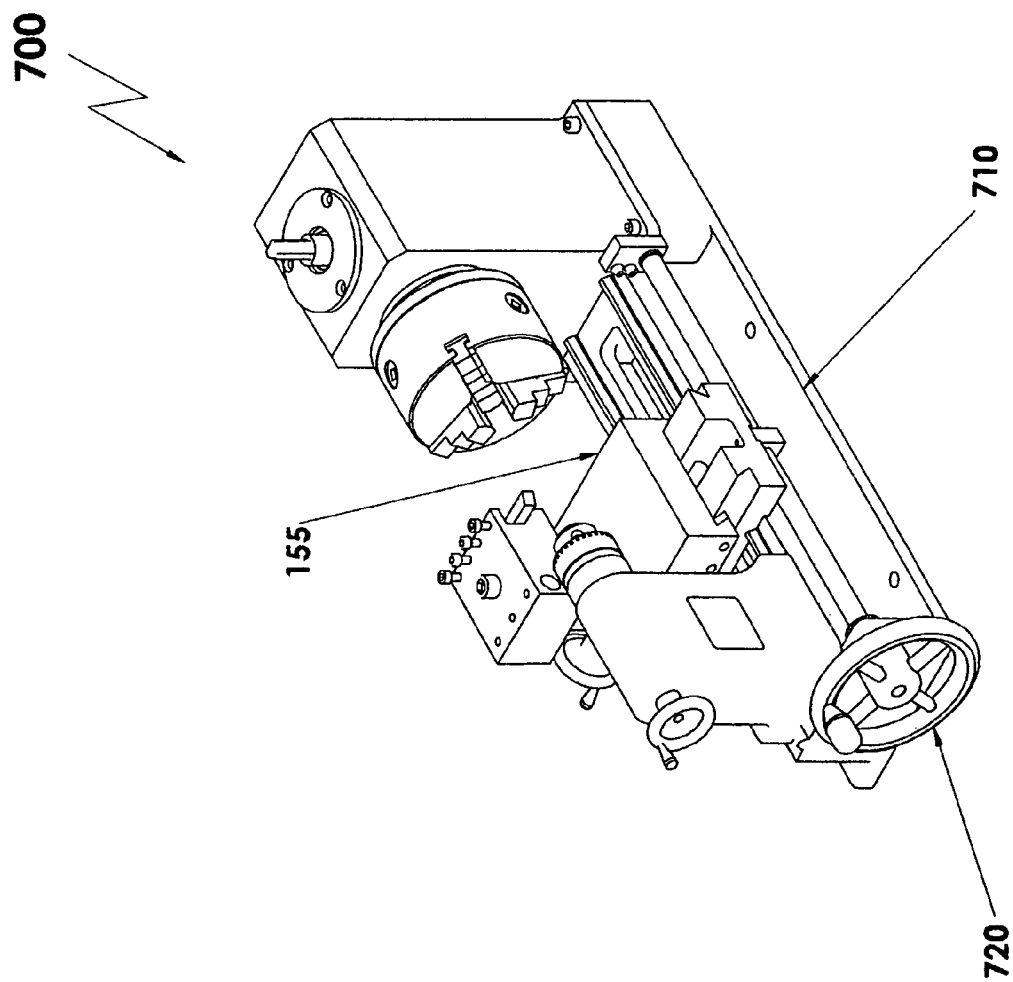

FIG. 7 illustrates a back view of a drill press lathe attachment configured as a metalworking lathe, according to one embodiment of the invention.

DETAILED DESCRIPTION OF PREFERRED EMBODIMENTS

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Various operations will be described as multiple discrete steps performed in turn in a manner that is helpful for understanding the present invention. However, the order of description should not be construed as to imply that these operations are necessarily performed in the order they are presented, nor even order dependent.

Figure 1B:
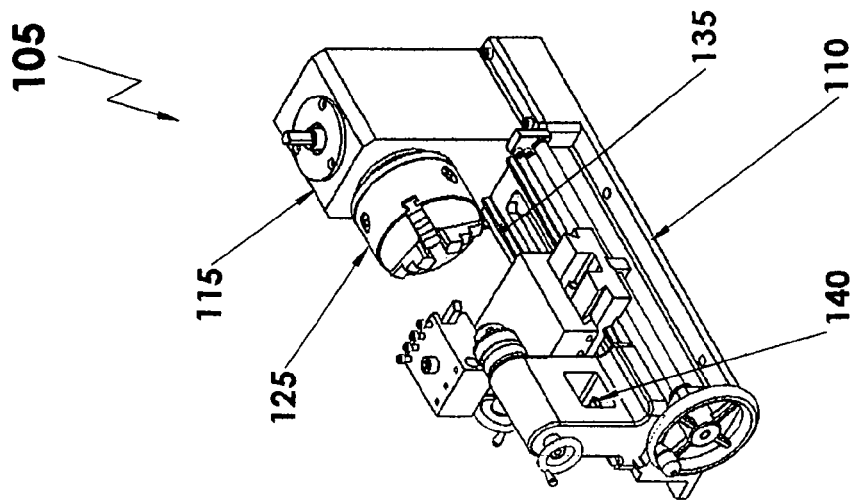
FIGS. 1a and 1b illustrate front and back views of a drill press lathe attachment configured as a metalworking lathe, according to one embodiment of the invention.
Figure 1A:
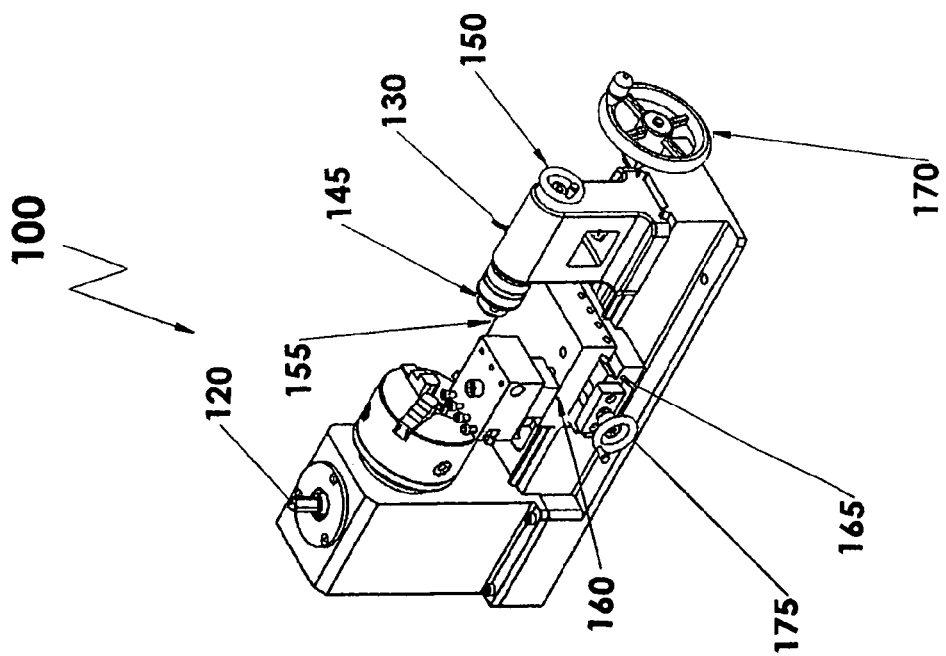

In various embodiments, the present invention pertains to a drill press lathe attachment that is attachable to an existing drill press. FIGS. 1a and 1b illustrate front 100 and back 105 views, respectively, of a drill press lathe attachment configured as a metalworking lathe, according to one embodiment of the invention. The drill press lathe attachment generally includes a base 110 and a power transfer box 115 along with components commonly found on a lathe, not including a motor. The power from the motor of the drill press is transmitted into the drill press lathe attachment by clamping the input shaft 120, which protrudes out vertically from the top of the power transfer box 115, with the chuck of the drill press. A workpiece may be held in place by a 3-jaw type chuck 125 mounted on a spindle driven by the power transfer box 115. As will be discussed below, other types of spindle attachments may be used to hold the workpiece.

As shown in FIGS. 1a and 1b, the drill press lathe attachment may be configured as a metalworking lathe. In such a configuration, the lathe typically includes a tailstock 130 for holding the workpiece axially aligned opposite the spindle and 125. The tailstock 130 may be slideably positioned along a precision ground ways 135 using a tailstock tightening nut 140. Once the tailstock 130 is roughly positioned along the ways 135, the workpiece (not shown) may be engaged between the chuck 125 and tailstock chuck 145 by tightening the workpiece within the chuck 125, moving the tailstock chuck 145 axially (horizontally) toward the spindle and chuck 125 using the tailstock handwheel 150, and tightening the workpiece within the tailstock chuck 145.

A carriage 155 may be provided for use with a movable platform (compound) upon which a toolpost may then be mounted. The toolpost is a holding device mounted on the compound into which a cutting tool may be clamped. The carriage 155 generally comprises an upper portion sometimes called a cross-slide 160 and a lower portion 165 slidably engaged with the ways 135. The lower portion 165 of the carriage assembly 155 may be moved axially (horizontally) along the ways 135 using a leadscrew handwheel 170. The cross-slide 160 portion of the carriage assembly 155 may be moved perpendicular to the ways 135 using a carriage handwheel 175. Using both leadscrew handwheel 170 and carriage handwheel 175 allows the carriage assembly to be precisely positioned. The cross-slide 160 typically incorporates a dovetail channel for slidably retaining it with the lower portion 165 of the carriage assembly 155.

Various techniques may be used for turning a workpiece using a conventional lathe. Likewise, similar techniques may be used with the drill press lathe attachment described herein. For example, using a drill press lathe attachment as in FIGS. 1a and 1b, the workpiece may be held by the chuck 125 without having to engage the tailstock chuck 145 or without having the tailstock 130 fastened upon the ways 135. An artisan or craftsperson is typically used to forming and using various jigs, aids, and other setups. The drill press lathe attachment described herein is designed to function the same as a standard or conventional mini-lathe except for its reliance upon an existing drill press for providing the rotational forces needed to rotate the spindle and, thus, the workpiece held thereon.

The various techniques used by craftspersons to fully utilize the capabilities of a lathe cannot be fully described herein. Likewise, the techniques available to craftspersons using a drill press lathe attachment as disclosed herein cannot be fully described in this disclosure and are limited only by the skill of the particular craftsperson using the device. As mentioned, the invention described herein provides the functionality of conventional lathes with the benefits (size, mobility, cost, flexibility, and so on) inherent in its design to work cooperatively with an existing drill press.

Although a drill press lathe attachment as shown in FIGS. 1a and 1b may vary widely in size, proportion, and dimensions, the drill press lathe attachment preferably cooperatively mates with a standard floor standing drill press. In one embodiment, the drill press lathe attachment may comprise a device with the similar dimensions to mini-lathes available from equipment manufacturers. For example, the drill press lathe attachment may have a swing over bed dimension of seven inches, a distance between centers of twelve inches, a swing over carriage of four inches, comprise a number three Morse Taper spindle, include a spindle through-hole diameter of three-quarters of an inch, and incorporate a number two Morse Taper in the tailstock. These specifications generally allow for the use of standard equipment available for use with lathes. For instance, a three inch three-jaw type chuck (visually similar and proportional to the chuck 125 shown in FIGS. 1a and 1b) may be used with standardized and commercially available spindle dimensions.

Craftspersons familiar with turning workpieces with lathes will readily understand the above exemplary specifications. Nevertheless, for the sake of clarity, the following definitions are used herein. Swing over bed refers to the diameter of the largest workpiece that can be rotated on the spindle without hitting the bed (or ways 135). Seven inches is a common swing over bed specification for a mini-lathe. However, a drill press lathe attachment as disclosed herein may be configured to accommodate larger diameter or smaller diameter workpieces.

Distance between centers refers to the longest workpiece that can be held between a center in the headstock and a center in the tailstock. A center in the headstock may comprise a three-jaw type chuck in the spindle or some other spindle configuration. A center in the tailstock may comprise an adjustable tailstock chuck (as with tailstock chuck 145 depicted in FIG. 1a) or a dead center or a live center or some other center for use with a standard lathe tailstock. Twelve inches is a common distance between centers specification for a mini-lathe. A drill press lathe attachment as disclosed herein, however, may be configured with a longer or shorter distance between centers.

Swing over the carriage refers to the diameter of the largest workpiece that can rotate over the carriage without hitting it. This dimension is typically four inches for a lathe with a seven inch swing over bed dimension. As with the aforementioned dimensions, this dimension may vary for a drill press lathe attachment as described herein. Various carriage assembly components may be used that may affect the available swing over the carriage dimension.

Diameter of spindle through-hole refers to the diameter of the hold that passes through the spindle. The spindle may not incorporate a through-hole. However, if the spindle does incorporate such a through-hole, longer workpieces that have a diameter less than the diameter of the spindle through-hole can pass through the spindle so that the free end of the workpiece may be worked (as, for example, in a facing operation on a piece of metal bar stock).

Figure 2B:
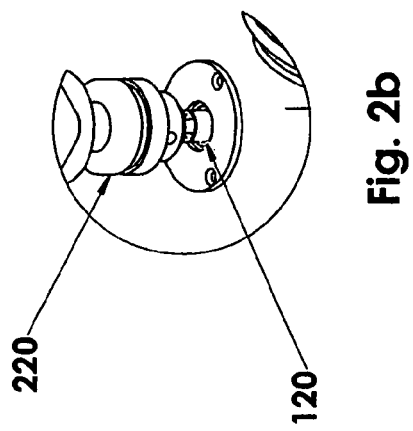
FIGS. 2a and 2b illustrate a drill press lathe attachment configured for operation with a standard drill press, according to one embodiment of the invention.
Figure 2A:
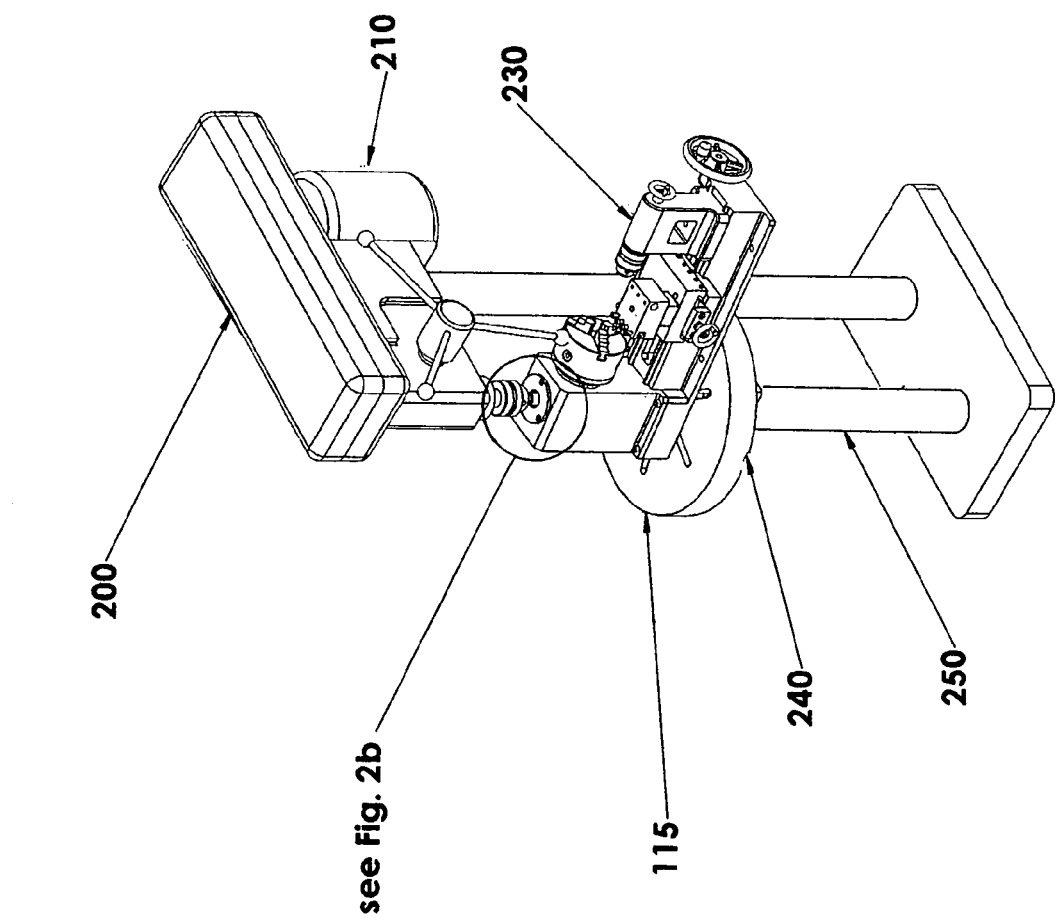

FIGS. 2a and 2b illustrate a drill press lathe attachment configured for operation with a standard drill press 200, according to one embodiment of the invention. The power from the motor 210 of the drill press 200 is transmitted into the drill press lathe attachment by clamping the input shaft as shown in FIG. 2b. FIG. 2b illustrates the drill press chuck 220 clamping onto the input shaft 120 which protrudes out vertically from the top of the power transfer box 115.

FIG. 2a further illustrates how a drill press lathe attachment 230 may be affixed to and supported by the drill press bed 240 of a standard floor standing drill press such as drill press 200. The drill press lathe attachment 230 may be secured to the drill press bed 240 using any of a wide variety of methods. Most drill press beds include slots for fastening jigs, aids, or other fixtures commonly used by craftspersons and those skilled in the use of such drill press equipment. The base of the drill press lathe attachment 230 may incorporate tapped holes to receive bolts to securely attach the drill press lathe attachment 230 to the drill press bed 240.

To further stabilize the drill press bed 240, a vertical support member 250 may be added. The vertical support member 250 may comprise any of a wide variety of material (i.e. metal tubing or pipe, wood 2"×4", etc.) and provides improved rigidity or stiffness to the drill press with lathe attachment configuration.

Figure 3:
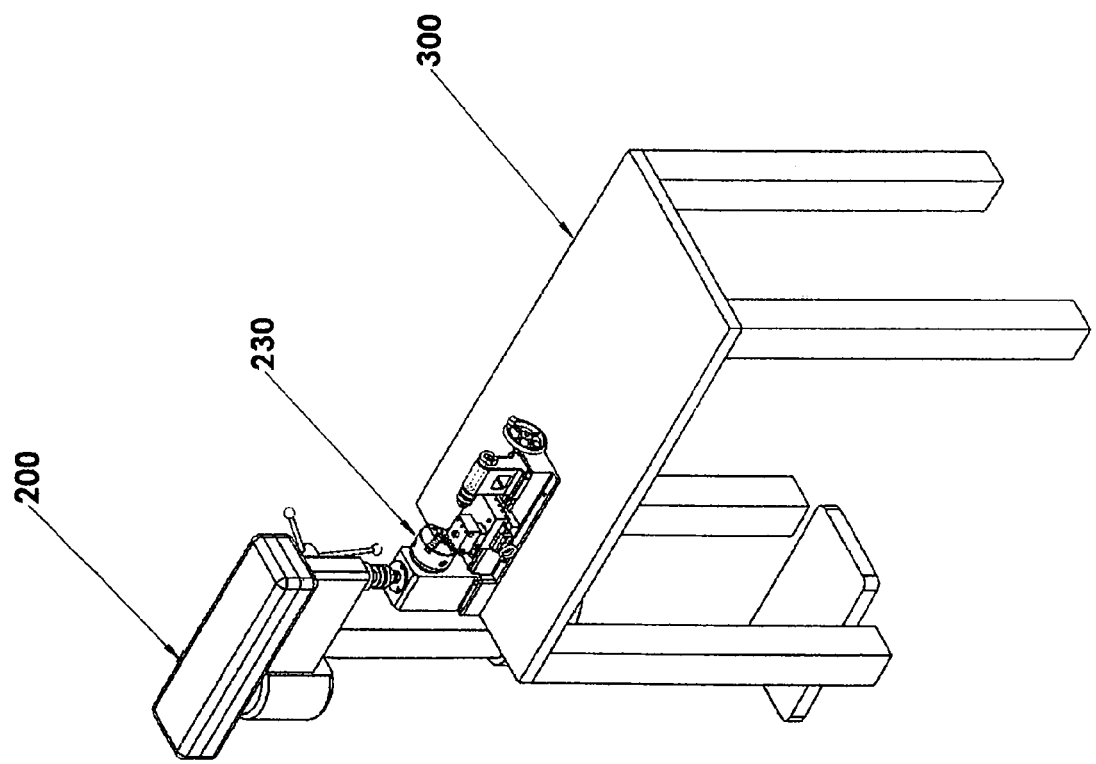
FIG. 3 illustrates a drill press lathe attachment configured for operation with a standard drill press and using an auxiliary work bench, according to one embodiment of the invention.

FIG. 3 illustrates a drill press lathe attachment 230 configured for operation with a standard drill press 200 and using an auxiliary work bench 300, according to one embodiment of the invention. While the work bench 300 may provide additional surface area for setting wrenches, cutting tools, workpieces, bar stock, or other items which might be useful to have in close proximity while operating the drill press lathe attachment 230, other means of support or other means of providing work surfaces may be used. For instance, a simple saw horse arrangement might be used to support the drill press lathe attachment 230 in place of the drill press bed 240 or the work bench 300 if it is desirable not to utilize the drill press bed 240 or for other reasons.

The work bench 300 may also be used with longer versions of the drill press lathe attachment 230. For example, a drill press lathe attachment 230 with a larger distance between centers (to accommodate axially longer workpieces) may be used. Depending upon the drill press 200 used (i.e. its size, configuration, rigidity, and so on), a work bench 300 may provide additional support for the drill press lathe attachment 230 as well as other tools, workpiece items, and so forth.

Figure 4:
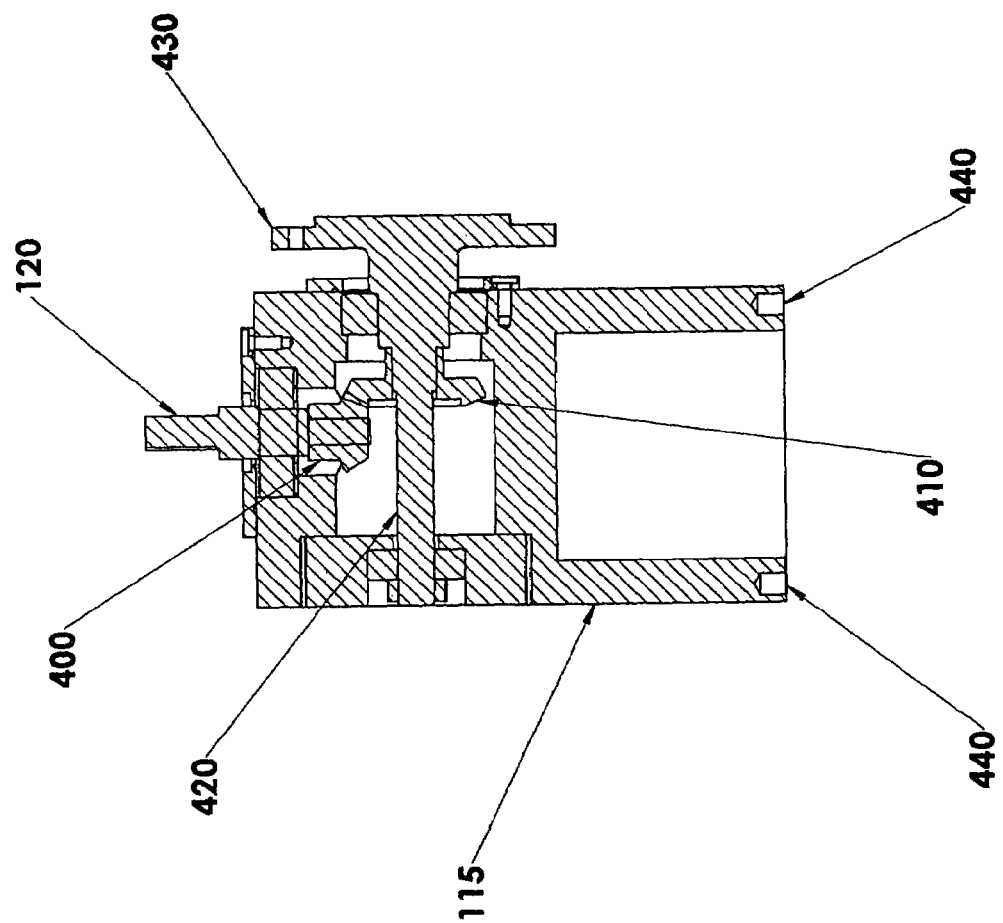
FIG. 4 illustrates a cross-sectional view of a power transfer box according to one embodiment of the invention.

Next, FIG. 4 illustrates a cross-sectional view of a power transfer box 115 according to one embodiment of the invention. Generally, the power transfer box 115 comprises an input shaft 120 with an input gear 400 at its opposite (downward) end. The input gear 400 meshes with another corresponding output gear 410 that is positioned horizontally on the output shaft 420 and mounting platform 430 which form the spindle for the drill press lathe attachment. The output shaft 420 and mounting platform 430 comprise the spindle and the axial alignment for the ways 135. As shown, the power transfer box 115 allows the power to be transmitted in and through the gears and redirected at a right angle.

The input gear 400 and the output gear 410 may be of the same or different diameter affecting the gear ratio. For example, the input gear 400 may be smaller than the output gear 410 to allow for greater torque at the output shaft 420 and spindle mounting platform 430. Additional gears may be incorporated for speed (rpm) adjustment. However, in one embodiment, changing the speed (rpm) of the drill press 200, and, thus, input shaft 120, correspondingly changes the speed (rpm) of the drill press lathe attachment.

Other details of the power transfer box 115, such as centerline locating pins 440, bearings, cover plates, and so on, are illustrated for exemplary purposes. Certain features, such as the centerline locating pins 440, may be incorporated to improve the overall precision of the lathe operation. However, such details are known for such precision lathe equipment and need not be described in further detail herein.

Moving on, FIGS. 5a, 5b, and 5c illustrate exemplary input and output shaft combinations associated with a power transfer box, according to one embodiment of the invention. For example, the power transfer box 115 may incorporate an output shaft mounting platform 430 onto which a workpiece or other holding devices may be affixed. One such attachment, a wood turning mounting plate 500, is shown in FIG. 5b. Another attachment, a metal turning holding chuck (or a three-jaw type chuck) 125, is shown in FIG. 5c. Operation of such spindle mounting plate attachments includes fastening the attachment (such as the three-jaw type chuck 125) to the mounting plate 430 perhaps using bolts with capture nuts and then appropriately holding workpiece (such as by tightening the holding jaws of the three-jaw type chuck 125). Thereafter, rotational forces applied to the input shaft 120 will turn the spindle mounting plate 430 and the workpiece held to it (in this case by the three-jaw type chuck 125 typically used for metalworking applications).

Also shown with FIGS. 5a, 5b, and 5c is an input shaft coupler 510 which may be optionally used to simplify setting up a drill press lathe attachment. For example, the input shaft coupler 510 may be positioned over the input shaft 120 subsequent to placement of the drill press lathe attachment upon the drill press bed, whereafter the input shaft coupler 510 may be slideably raised upward to engage with the drill press chuck and thereby providing a coupling between the drill press chuck and the power transfer box 115. The input shaft coupler 500 may be incorporated into the design of the input shaft 120 whereby engagement of the power transfer box 115 with a drill press chuck is accomplished through engagement of the drill press chuck with the input shaft of the power transfer box 115 having an integral coupler 510.

As mentioned previously, a drill press lathe attachment as described herein may be configured as would a traditional woodworking or metalworking lathe. FIGS. 6a and 6b illustrate front 600 and back 605 views, respectively, of a drill press lathe attachment configured as a woodworking lathe, according to one embodiment of the invention. A typical tool rest 620 is shown whereupon traditional handheld cutting tools may be held for removing material from a horizontally rotating workpiece to form it into a desired shape. The tool rest 620 may be repositioned along the horizontal axis of rotation by moving the tool rest carriage 630 along the ways between the spindle and tailstock. Other woodworking attachments, jigs, fixtures, or techniques commonly used with traditional woodworking lathes may also be used.

Also as mentioned previously, many of the features found on lathes may be incorporated with a drill press lathe attachment as described herein. Further, various features or attachments may be repositioned to better suit the compact design of the drill press lathe attachment. For example, FIG. 7 illustrates a back view of a drill press lathe attachment 700 configured as a metalworking lathe, according to one embodiment of the invention, showing the leadscrew 710 and the leadscrew handwheel 720 positioned to the rear of the carriage assembly 155 as opposed to the front side (not shown). Positioning the leadscrew 710 rearward may enhance the operation of the drill press attachment insofar as material removed from the workpiece may be less likely to accumulate on the leadscrew. Consequently, maintenance and cleanup may be improved by such positioning.

As described herein, the present invention provides a drill press lathe attachment designed for rotating a workpiece along a horizontal axis to remove material from the workpiece to form it into a desired shape. The drill press lathe attachment comprises a base and a power transfer box along with components commonly found on a lathe, but without a motor. The drill press lathe attachment, or "motorless" lathe, may be mounted directly to the bed of an existing drill press thereby providing an alternative means of achieving turning operations without needing a traditional motor driven lathe.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A drill press lathe attachment for attachment to a drill press and for turning a workpiece about a horizontal axis, said drill press lathe attachment comprising:
    a base which may be securely fastened to a drill press bed via means for attaching the base to the drill press bed, said base having a ways formed thereupon on which are slideably positioned a cutting tool and a tailstock; and
    a power transfer box at one end of said base, said power transfer box having an input shaft linked by one or more gears to a spindle for turning the workpiece about the horizontal axis, said input shaft capable of engagement with a drill press chuck and receiving rotational forces therefrom so as to rotate about a vertical axis, said one or more gears capable of transmitting said rotational forces from said input shaft to said spindle to thereby rotate said spindle and the workpiece about said horizontal axis.

2. The drill press lathe attachment of claim 1, further comprising:
    a mounting plate formed upon said spindle and capable of holding said workpiece, said mounting plate capable of receiving at least one of a wood turning mounting plate and a metal turning holding chuck.

3. The drill press lathe attachment of claim 2, wherein said metal holding chuck comprises a three-jaw type chuck.

4. The drill press lathe attachment of claim 1, wherein the tailstock includes a chuck for holding said workpiece in rotational alignment with said spindle.

5. The drill press lathe attachment of claim 1, further comprising a carriage assembly slidably engaged with said ways, said carriage assembly for holding the cutting tool, which cutting tool is positioned for turning said workpiece.

6. The drill press lathe attachment of claim 5, wherein said cutting tool comprises a metal turning tool and said carriage assembly comprises:
    a lower portion slidably engaged with said ways and movable along said ways by rotating a leadscrew; and
    a cross-slide slidably retained with said lower portion, said cross-slide capable of sliding in a direction perpendicular with said leadscrew.

7. The drill press lathe attachment of claim 1, further comprising a carriage assembly slidably engaged with said ways, wherein said cutting tool comprises a handheld wood turning tool and said carriage assembly comprises a tool rest for use with said handheld wood turning tool.

8. The drill press lathe attachment of claim 1, further comprising:
    a carriage assembly slidably engaged with said ways, said carriage assembly for holding the cutting tool, which is positioned for turning said workpiece; and
    wherein the tailstock is slidable upon said ways, said tailstock including a chuck for holding said workpiece in rotational alignment with said spindle.

9. The drill press lathe attachment of claim 1, wherein said power transfer box transmits rotational forces from said drill press chuck through a first gear integral with said input shaft to a second gear integral with said spindle thereby redirecting said rotational forces from an axis of rotation associated with said drill press chuck to said horizontal axis of rotation associated with said spindle.

10. The drill press lathe attachment of claim 9, wherein said first gear and said second gear redirect said rotational forces from a vertical axis of rotation to said horizontal axis of rotation.

11. A drill press with drill press lathe attachment for rotating a workpiece about a horizontal axis to remove material from the workpiece to form it into a desired shape, said drill press with drill press lathe attachment comprising a drill press having a column, a power source mounted upon said column, a drill press chuck rotatably driven by said power source about an axis parallel to said column, a drill press bed attached to said column, said drill press bed being adjustable along said column to vary a distance between said drill press chuck and said drill press bed, and a drill press lathe attachment comprising:
    a base which may be securely fastened to said drill press bed, said base having a ways formed thereupon on which are slideably positioned a cutting tool and a tailstock; and
    a power transfer box at one end of said base, said power transfer box having an input shaft linked by one or more gears to a spindle for rotating the workpiece about the horizontal axis, said input shaft capable of engagement with the drill press chuck and receiving rotational forces therefrom so as to rotate about a vertical axis, said one or more gears capable of transmitting said rotational forces from said input shaft to said spindle to thereby rotate said spindle and the workpiece about said horizontal axis.

12. The drill press with drill press lathe attachment of claim 11, further comprising:
    a mounting plate formed upon said spindle and capable of holding said workpiece, said mounting plate capable of receiving at least one of a wood turning mounting plate and a metal turning holding chuck.

13. The drill press with drill press lathe attachment of claim 11, wherein the tailstock includes a chuck for holding said workpiece in rotational alignment with said spindle.

14. The drill press with drill press lathe attachment of claim 11, further comprising a carriage assembly slidably engaged with said ways, said carriage assembly for holding the cutting tool, which cutting tool is positioned for turning said workpiece.

15. The drill press with drill press lathe attachment of claim 14, wherein said cutting tool comprises a metal turning tool and said carriage assembly comprises:
    a lower portion slidably engaged with said ways and movable along said ways by rotating a leadscrew; and
    a cross-slide slidably retained with said lower portion, said cross-slide capable of sliding in a direction perpendicular with said leadscrew.

16. The drill press with drill press lathe attachment of claim 11, further comprising a carriage assembly slidably engaged with said ways, wherein said cutting tool comprises a handheld wood turning tool and said carriage assembly comprises a tool rest for use with said handheld wood turning tool.

* * * * *